United States Patent [19]

Cook et al.

[11] 4,052,528

[45] Oct. 4, 1977

[54] TETRAPOLYMER SUBBED PHOTOGRAPHIC FILM

[75] Inventors: Robert Stanley Cook; Peter John Wright, both of Ilford, England

[73] Assignee: Ciba-Geigy AG, Basel, Switzerland

[21] Appl. No.: 589,224

[22] Filed: June 23, 1975

[30] Foreign Application Priority Data

July 4, 1974 United Kingdom ............... 29665/74

[51] Int. Cl.[2] ........................ B32B 27/08; B32B 27/28; B32B 27/36; G03C 1/80

[52] U.S. Cl. .................................... 428/483; 96/87 R; 260/63 UY; 260/63 HA; 526/291; 427/40; 427/407 F

[58] Field of Search .................. 428/483; 427/40, 307, 427/407; 96/87 R; 260/63 UY, 63 HA, 78.5 R, 78.5 CL

[56] References Cited

U.S. PATENT DOCUMENTS

| | | | |
|---|---|---|---|
| 3,143,421 | 8/1964 | Nadeau | 96/87 R |
| 3,357,874 | 12/1967 | Kennedy | 428/483 |
| 3,586,508 | 6/1971 | Fowler | 96/87 R |
| 3,600,208 | 8/1971 | Abbott | 428/483 X |
| 3,666,532 | 5/1972 | Reedy | 428/483 X |
| 3,674,531 | 7/1972 | Shephard | 428/483 |
| 3,712,812 | 1/1973 | Paesschen | 96/87 R |
| 3,738,838 | 6/1973 | Ando | 96/87 R |

*Primary Examiner*—Dennis L. Albrecht

*Attorney, Agent, or Firm*—Burgess, Dinklage & Sprung

[57] ABSTRACT

The present invention relates to polyester film material. Adherent to the polyester base the film material comprises a copolymer of a. vinylidene chloride, b. alkyl acrylate, alkyl methacrylate, vinyl acetate and/or acrylonitrile c. a copolymerizable acid and d. a halogenoacetic acid allyl- or vinyl ester or a halogenomethyl vinyl ketone.

The copolymer forms a subbing layer suitable for anchoring silver halide emulsion layers on the poly-ester film base.

4 Claims, No Drawings

TETRAPOLYMER SUBBED PHOTOGRAPHIC FILM

It is known that self-supporting films formed of synthetic linear polyesters, particularly of the polyesters formed by reaction of ethylene glycol and terephthalic acid, may be prepared with mechanical and physical and chemical properties which, for example, render then very suitable indeed as base materials on which may be coated silver halide photographic emulsion layers for the production of photographic film materials.

However, since such film materials are inherently highly hydrophobic and the usual gelatino silver halide emulsions are highly hydrophilic, there is great difficulty in securing adequate anchorage between the base film and the emulsion layer, especially bearing in mind that the anchorage must remain firm throughout the processing sequence of the final photographic film.

It is known to deal with such a difficulty by the provision of an anchoring layer or layers (so-called "subbing" layers) between the film base and the emulsion layer, but the materials hitherto suggested for this purpose in connection with other film bases have not always proved entirely satisfactory when applied to film base of biaxially oriented synthetic linear polyesters of highly hydrophobic character.

Therefore according to the present invention there is provided film material comprising a film of biaxially oriented synthetic linear polyester of highly hydrophobic character having superimposed thereon adherent to said film a layer which comprises a copolymer of (a) vinylidene chloride, (b) as a further copolymerisable ethylenically unsaturated monomer alkyl acrylate, alkyl methacrylate, vinyl acetate or acrylonitrile (c), at least one copolymerisable acid and (d) either an allyl or vinyl component containing an active halogen group the monomer of which has the formula (1)

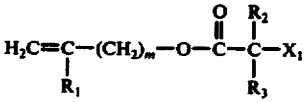

wherein *m* is 0 or 1, $R_1$ is a hydrogen atom or a methyl group when *m* is 1 but is a hydrogen atom when *m* is 0, $X_1$ is a bromine or chlorine atom and $R_2$ and $R_3$ are each hydrogen atom or a methyl group or are the same halogen atom as $X_1$, or (d) a vinyl component containing an active halogen group the monomer of which has the formula (2)

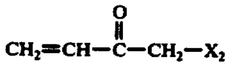

wherein $X_2$ is a chlorine or bromine atom.

The copolymer may comprise from 20 - 90 mole % vinylidene chloride (a), from 5-50 mole % ethylenically unsaturated monomer (b), from 1-20 mole % copolymerisable acid (c) and from 1-30 mole % of the allyl or vinyl component (d) of formula (1) or (2).

Examples of suitable acid units (c) present in the copolymer are those derived from acrylic acid, methacrylic acid, itaconic acid, maleic acid, fumaric acid, crotonic acid, mesaconic acid and citraconic acid.

The copolymer of use in the present invention may be prepared and coated on the polyester base either as an organic solvent solution or as an aqueous latex. The actual copolymerisable ethyleneically unsaturated monomer used in the copolymer depends on whether the copolymer is to be prepared as an organic solvent solution or as a latex.

When the copolymer is to be prepared as an organic solvent solution the preferred copolymerisable ethylenically unsaturated monomers (b) are alkyl acrylates and methacrylates. In such case the ethylenically unsaturated monomer units is required to the be present when the copolymer is formed because it helps to render the copolymer soluble in organic solvents and the help control the film forming properties of the copolymer.

The preferred alkyl acrylates or methacrylates are the lower alkyl acrylates, or methacrylates i.e. those having from 1 to 4 carbon atoms in the alkyl group.

When the copolymer is to be prepared as an organic solvent solution preferably it comprises from 40-80 mole % vinylidene chloride (a), from 10-50 mole % ethylenically unsaturated monomer (b), from 5-20 mole % copolymerisable acid (c) and from 5-28 mole % of the allyl or vinyl component (d).

The preferred copolymerisable acid (c) when the copolymer is to be prepared as an organic solvent solution is acrylic acid.

When the copolymer is to be prepared as a latex the preferred copolymerisable ethylenically unsaturated monomers (b) are alkyl acrylates or methacrylates. In this case the monomers act also to control and modify the film-forming properties of the copolymer.

When the copolymer is to be prepared as a latex the preferred copolymerisable acid (c) its itaconic acid.

When the copolymer is to be prepared as a latex preferably it comprises from 60-85 mole % vinylidene chloride (a), from 7-20 mole % ethylenically unsaturated monomer (b), from 1.0-3 mole % copolymerisable acid (c) and from 5-20 mole % of the allyl or vinyl component (d).

In the copolymer of use in the present invention the vinylidene chloride units give the copolymer good film-forming properties and good adhesion to the polyester. The presence of the allyl or vinyl component (d) of formula (1) or (2) which contains at least one active halogen atom in the copolymer which comprises the subbing layer enables a hydrophilic layer for example a gelatin or a polyvinyl alcohol based layer which has been coated on the film base material of the present invention to adhere very strongly to the film base material.

The presence of the copolymerisable acid component in the copolymer helps the overall dry adhesion properties of the copolymer subbing layer.

Formula (1) covers two classes of monomers: allyl or methallyl halogeno esters of the formula (3)

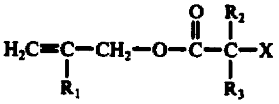

and vinyl halogeno esters of the formula (4)

-continued

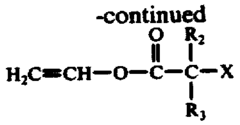

wherein in the above formula (3) and (4) $R_1$, $R_2$, $R_3$ and X have the meanings given to them above.

The preferred monomers of formula (3) for use in the copolymer of use in the present invention are those of the formula (5)

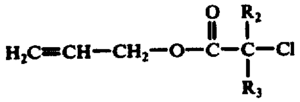

wherein $R_2$ and $R_3$ have the meanings given them above. The most preferred monomer is allyl monochloroacetate.

The preferred monomers of formula (4) for use in the copolymer of use in the present invention are those of the formula (6)

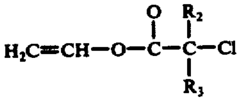

wherein $R_2$ and $R_3$ have the meaning given them above and the most preferred monomer is vinyl monochloroacetate which is available commercially.

The allyl or methallyl halogeno esters of formula (3) may be prepared by reacting allyl or methallyl alcohol with the appropriate halocarboxylic acid.

The vinyl halogenesters of formula (4) may be prepared by reacting acetylene with the appropriate halocarboxylic acid in the presence of a catalyst, for example mercuric oxide or by the transvinylation reaction between vinyl acetate and the appropriate halocarboxylic acid.

The halomethyl vinyl ketones of formula (2) may be prepared by following the method of Cath et al, J. Chem. Soc. 1948 page 278.

A particularly suitable copolymer prepared as an organic solvent solution for use in the present invention comprises 53.0 mole % vinylidene chloride, 28.2 mole % methyl acrylate, 12.5 mole % acrylic acid and 6.3 mole % of allyl monochloroacetate. The following preparation illustrates the preparation of this copolymer.

PREPARATION 1

Vinylidene chloride (60.5g) was mixed together with 28.8. of methyl acrylate. 10.6 g of acrylic acid and 11.1 g of allyl monochloroacetate in 100 ml of methyl ethyl ketone to give a 50% by volume solution, the temperature of the methyl ethyl ketone being 40° C. Then as copolymerisation initiator 1.0 g of 2, 2'- azobisisobutyronitrile was added to the monomer solution. The solution was maintained at 40° C until the copolymerisation was complete, which took 6 days.

Infra-red spectra and titrimetric analysis showed that substantially all the monomers had been incorporated into the copolymer which thus contained about 53.0 mole % vinylidene chloride, 28.2 mole % methyl acrylate, 12.5 mole % acrylic acid and 6.3 mole % allyl monochloroacetate. This copolymer was used in Example 1 which follows.

A second copolymer was prepared similarly using maleic acid (8.5g) instead of acrylic acid. The mole % of this copolymer was 53.0 mole % vinylidene chloride, 28.2 mole % methyl acrylate, 12.5 mole % maleic acid, and 6.3 mole % allyl monochloroacetate. This copolymer was also used in Example 1.

A third copolymer was prepared similarly using masaconic acid (9.5g) instead of acrylic acid. The mole % of this copolymer was 53.0 mole % vinylidene chloride, 28.2 mole % methyl acrylate, 12.5 mole % maleic acid and 6.3 mole % allyl monochloroacetate. This copolymer was used in Example 1.

A fourth copolymer was prepared similarly using vinyl acetate (28.8g) instead of methyl acrylate. The mole % of this copolymer was 53.0 mole % vinylidene chloride, 28.2 mole % vinyl acetate, 12.5 mole % acrylic acid and 6.3 mole % allyl monochloroacetate. This copolymer was used in Example 2.

Instead of methyl ethyl ketone, dioxan or dichlormethane may be used as the organic solvent in which to dissolve the comonomers for the copolymerisation reaction.

PREPARATION 2

A copolymer was prepared as in preparation 1 but the quantities of monomers added were as follows:

| | |
|---|---|
| vinylidene chloride | 50 ml |
| methyl acrylate | 25 ml |
| allyldichloroacetate | 10 ml |
| acrylic acid | 15 ml |

The resulting copolymer comprised vinylidene chloride 53 mole %, methyl acrylate 23 mole %, allyl dichloroacetate 6 mole % and acrylic acid 18 mole %.

The copolymer 2 of this preparation was used in Example 2 which follows.

PREPARATION 3

A copolymer was prepared as in preparation 1 but the quantities of monomers added were as follows:

| | |
|---|---|
| vinylidene chloride | 50 ml |
| methyl acrylate | 25 ml |
| allylmonobromoacetate | 10 ml |
| acrylic acid | 15 ml |

The resulting copolymer comprised vinylidene chloride 53 mole %, methyl acrylate 23 mole %, allylbromoacetate 6 mole % and acrylic acid 18 mole %.

The copolymer 3 of this preparation was used in Example 2 which follows.

PREPARATION 4

A copolymer was prepared as in preparation 1 but the quantities of monomers added were as follows:

| | |
|---|---|
| vinylidene, chloride | 50 ml |
| methyl acrylate | 25 ml |
| allylmonochloropropionate | 10 ml |
| acrylic acid | 15 ml |

The resulting copolymer comprised vinylidene chloride 53 mole %, methyl acrylate 22 mole %, allylmonochloropropionate 7 mole % and acrylic acid 18 mole %.

The copolymer 4 of this preparation was used in Example 2 which follows.

PREPARATION 5

A copolymer was prepared as in preparation 1 but the quantities of monomers added were as follows:

| | |
|---|---|
| vinylidene chloride | 50 ml |
| methyl acrylate | 25 ml |
| vinylmonochloroacetate | 10 ml |
| acrylic acid | 15 ml |

The resulting copolymer comprised vinylidene chloride 52 mole %, methyl acrylate 27 mole %, vinylmonochloroacetate 9 mole % and acrylic acid 17 mole %.

The copolymer 5 of this preparation was used in Example 2 which follows.

PREPARATION 6

A copolymer was prepared as in preparation 1 but the monomers and quantities thereof added were as follows:

| | |
|---|---|
| vinylidene chloride | 50 ml |
| methyl acrylate | 25 ml |
| methallyl monobromopropionate | 10 ml |
| acrylic acid | 15 ml |

The resulting copolymer comprised vinylidene chloride 54 mole % methyl acrylate 23 mole % methallyl monobromopropionate 5 mole %, acrylic acid 18 mole %.

The copolymer 6 of this preparation was used in Example 2 which follows.

PREPARATION 7

A copolymer was prepared as in preparation 1 but the monomers and quantities thereof added were as follows:

| | |
|---|---|
| vinylidene chloride | 40 ml |
| methyl acrylate | 42 ml |
| monochloromethyl vinyl ketone | 10 ml |
| acrylic acid | 6 ml |
| itaconic acid | 2 g |

The resulting copolymer comprises vinylidene chloride 44 mole %, methyl acrylate 38 mole %, monochloromethyl vinyl ketone 9.0 mole %, acrylic acid 7.5 mole % and itaconic acid 1.4 mole %, the percentages being as units in the copolymer.

The copolymer of this preparation was used in Example 3 which follows:

PREPARATION 8

A copolymer was prepared as in preparation 1 but the monomers used and the quantities thereof added were as follows:

| | |
|---|---|
| vinylidene chloride | 50 mls |
| methyl acrylate | 35 mls |
| acrylic acid | 15 mls |

The resulting copolymer comprised vinylidene chloride 52 mole %, methyl acrylate 30 mole % and acrylic acid 18 mole %.

This copolymer does not contain a monomer of formal I or formula II as the active comonomer has been replaced by monomethyl acrylate. This copolymer 8 was used in a comperative in Example 2.

PREPARATION 9

A copolymer was prepared as in preparation 1 but the monomers used and the quantities thereof added were as follows:

| | |
|---|---|
| vinylidene chloride | 50 mls |
| methyl acrylate | 25 mls |
| vinyl acetate | 10 mls |
| acrylic acid | 15 mls |

The resulting copolymer comprised vinylidene chloride 52 mole %, methyl acrylate 22 mole %, vinyl acetate 8 mole % and acrylic acid 18 mole %. This copolymer does not contain a monomer of formula I or II as the active comonomer has been replaced by vinyl acetate. This copolymer was used in a comparative test in Example 2.

A particularly suitable copolymer prepared as a latex for use in the present invention comprises vinylidene chloride 81 mole %, methyl acrylate 10 mole %, allyl monochloroacetate 7.0 mole % and itaconic acid 1.4 mole %.

The following preparation illustrate the preparation of this copolymer.

PREPARATION 10

A latex was prepared in 500 ml three-necked flask fitted with a water condenser (using chilled water) and a stirrer both being substantially gas-tight. A pressure release valve operating at 1 atmosphere over pressure was also fitted.

To the vessel were added do-oxygenated water 150 ml, vinylidene chloride 97.5g, methyl acrylate 9.2g, allyl monochloro acetate 11.2g, itaconic acid 2.25g, sodium alkyl aryl polyether sulphate 0.4g (as sufactant), alkyl aryl polyglycidol (as surfactant) 0.13 g, sodium persulphate 1 g (as copolymerisationinitiater) and sodium metabisulphite (as copolymerisation accelerator) 1g. This emulsion was stirred for three hours at 35° C and then the latex was decanted.

This latex was used in Example 4 which follows and is designated latex 1.

PREPARATION 11

A latex was prepared as in preparation 10 but the quantities of monomers added were as follows:

| | |
|---|---|
| vinylidene chloride | 72.5 g |
| methyl acrylate | 18.2 g |
| vinyl monochloroacetate | 10.5 g |
| itaconic acid | 2.25 g |

The resulting copolymer comprised vinylidene chloride 66.0 mole %, methyl acrylate 21.4 mole %, vinyl monochloroacetate 10.90 mole % and itaconic acid 1.5 mole %.

This latex was used in Example 4 which follows and is designated as latex 2.

PREPARATION 12

A latex was prepared as in preparation 10 but with the quantities of monomers added as follows:

| | |
|---|---|
| vinylidene chloride | 80 g |

-continued

| | |
|---|---|
| methyl acrylate | 11 g |
| allyl dichloroacetate | 13.2 g |
| itaconic acid | 2.25 g |

The resulting copolymer comprised vinylidene chloride 77.2 mole %, methyl acrylate 13.8 mole %, allyl dichloroacetate 7.3 mole % itaconic acid 1.6 mole %.

This latex was used in Example 4 which follows and is designated as latex 3.

PREPARATION 13

A latex was prepared as in preparation 11 but using butan-2-one peroxide as initiator and sodium formaldehyde sulphoxylate as accelerator with the quantities of monomers added as follows:

| | |
|---|---|
| vinylidene chloride | 97.5 g |
| acrylonitrile | 89 g |
| allyl monochloroacetate | 11.2 g |
| itaconic acid | 2.5 g |

The resulting coppolymer comprised vinylidene chloride 79.5 mole %, acrylonitrile 12 mole %, allyl monochloroacetate 7 mole % and itaconic acid 1.5 mole %.

This latex is designated as latex 4 and was used in Example 4 which follows:

PREPARATION 14

A latex was prepared as in preparation 10 but the quantities of monomers added were as follows:

| | |
|---|---|
| vinylidene chloride | 80 g |
| methyl acrylate | 10 g |
| itaconic acid | 2.25 g |

The resulting copolymer does not contain any allyl or vinyl component of formula (1) or (2) and therefore this copolymer is not a copolymer as used in the present invention. However it was used in the comparative test set forth in Example 4 which follows. The latex of this preparation is designated latex 5.

PREPARATION 15

A latex was prepared as in Preparation 10 but the quantities of monomers added were as follows:

| | |
|---|---|
| vinylidene chloride | 97.5 g |
| methyl acrylate | 9.2 g |
| vinyl acetate | 11.2 g |
| itaconic acid | 2.25 g |

The resulting copolymer does not comprise any allyl or vinyl component of formulae (1) or (2) and therefore this copolymer is not a copolymer as used in the present invention. However the latex of this copolymer was used in the comparative test set forth in Example 4 which follows.

The latex of this preparation is desiganted latex 6.

In order to prepare the film base material of the present invention it is necessary to treat the film of synthetic biaxially oriented linear polyester before the polymer layer is coated thereon.

Therefore according to another aspect of the present invention there is provided a process for the production of film base material which comprises treating at least one side of a film of synthetic biaxially oriented linear polyester of highly hydrophobic character to enable a polymer layer to adhere thereto and then coating on to the treated side or sides an organic solvent solution of the copolymer or an aqueous latex of the copolymer as hereinbefore defined which contains units of the monomer of formula (1) or (2).

In this aspect of the present invention when the said copolymer is coated on the treated film base as an organic solvent solution the said copolymer preferably comprises from 40–80 mole % vinylidene chloride (a), from 10–50 mole % ethylenically unsaturated monomer (b), from 5–20 mole % copolymerisable acid (c) and from 5–25 mole % of the allyl or vinyl component (d) of formula (1) or (2).

Preferably the copolymerisable acid (c) is acrylic acid.

Preferably the ethylenically unsaturated monomer (b) is an alkyl acrylate or methacrylate and most preferably methyl acrylate.

Preferably the allyl component which is a monomer of formula (3) is an allyl halogeno ester and most preferably is allyl monochloroacetate.

Preferably the vinyl component which is a monomer of formula (4) is a vinyl halogenoacetate. Most preferably it is vinyl monochloroacetate.

The preferred organic solvents in which to dissolve the copolymer hereinbefore defined are methyl ethyl ketone, dioxan and acetone or mixtures thereof.

In this aspect of the present invention when the said copolymer is coated on the treated film base as an aqueous latex the said copolymer preferably comprises from 60–85 mole % vinylidene chloride (a), from 7–20 mole % ethylenically unsaturated monomer (b), from 1.03 mole % copolymerisable acid (c) and from 5–20 mole % of the allyl or vinyl component (d) of formula (1) or (II).

Preferably the copolymerisable acid (c) is itaconic acid.

Preferably the ethylenically unsaturated monomer (b) is an alkyl acrylate or methacrylate or acrylonitrile; most preferably is a methyl acrylate.

Preferably, the allyl component which is a monomer of formula (3), i.e. an allyl halogeno ester, is an allyl halogeno acetate and most preferably allyl monochloroacetate.

Preferably the vinyl component in a monomer of formula (4) and more preferably is a vinyl halogenoacetate. Most preferably it is a vinyl monochloroacetate.

Preferably the treatment of the side of the film of synthetic linear polyester which enables a polymer layer to adhere thereto is to coat on to the side of the polyester film an organic solvent solution or aqueous solution of a phenolic adhesion promoting agent and then to remove the solvent, preferably by evaporation.

Synthetic organic solvents in which to dissolve the phenolic adhesion promoting agents are methanol, ethanol, methyl ethyl ketone, acetone and dioxan or mixture thereof.

By "phenolic adhesion promoting agent" is meant a phenol-based or naphthol-based compound which is capable of acting on the polyester film base so as to render its surface more receptive to an applied layer. Examples of such compounds are m - cresol, o-cresol, resorcinol, orcinol, catechol, pyrogallol, 1-naphthol each of which compounds may be substituted with one or more chloro, fluoro- or nitro substituents and phenol substituted with one or more chloro-, fluoro- or nitro-substituents. The action of the adhesion promoting agent on the polyester film base is thought to be swelling action and polyester surfaces so treated are reactive to certain polymeric subbing layers but not to hydrophilic layers for example a gelatin or polyvinyl alcohol.

Alternatively the film of polyester may be treated by a physical method, for example corona discharge treatment, which renders the surface capable of accepting a resin layer as described in British Patent Specifications Nos. 1,262,127, 1,267,215 and 1,286,457.

The film base material of the present invention is able to accept a hydrophilic layer adherent thereto, for example a gelatin based layer, a polyvinyl alcohol layer or polyvinyl acetal layer.

The gelatin based layer may be a gelatino silver halide emulsion layer but usually when the process of the present invention is employed to prepare film material for use in the production of photographic gelatino silver halide material an intermediate gelatin layer is provided between the copolymer layer as hereinbefore defined and the silver halide emulsion layer. Such an intermediate layer is used in the examples which follow.

The presence of the active halogen atoms in the copolymer used as a subbing layer in the film of the present invention enables a gelatin-based layer to adhere very firmly to the film base and the danger of the gelatin based layer frilling away from the film base during prolonged aqueous solution processing and washing if the base be used in photographic material is substantially eliminated.

When the hydrophilic layer to be applied to the film material as prepared by the process of the present invention is polyvinyl alcohol or polyvinyl acetal such a hydrophilic layer may comprise a light-sensitive diazonium salt to produce a diazotype material.

Alternatively after a polyvinyl alcohol or polyvinyl acetal layer has been coated on to the film base material as prepared by the process of the present invention the polyvinyl alcohol or polyvinyl acetal may have incorporated therein or be coated a light-sensitive diazonium salt to produce a diazotype material.

EXAMPLE 1

The following coatings were applied sequentially to biaxially oriented film based on the synthetic linear polyester obtained from ethylene glycol and terephthalic acid which is highly hydrophobic.

First coating:

| | |
|---|---|
| solution of | |
| p - Chlor-m-cresol | 2 g |
| Methanol | 100 ml |

dried 2 minutes at 70° C.

Second coating:

solution of copolymer which comprised vinylidene chloride 53.0 mole % methyl acrylate 28.2 mole %, allyl monochloroacetate 6.3 mole %, and acrylic acid 12.5 mole %, the preparation of which was first described in preparation 1.2 g in Methyl ethyl Ketone 100 ml dried at 100° C for 5 minutes.

Third coating:

| | |
|---|---|
| Deashed gelatin | 1.68 ml |
| Glacial acetic acid | 1.20 ml |
| Water | 6.0 ml |
| Methanol | 90.7 ml |

-continued

| | |
|---|---|
| Ethyl lactate | 1.09 ml |
| Formalin 30% by weight aqueous solution | 0.07 ml |

Air dried for 5 minutes followed by 15 minutes at 105° C.

Three more similar subbed film bases were prepared using in the second coating instead of the copolymer first prepared in Preparation 1:

Second sample employed the second copolymer of Preparation 1.

Third sample employed the third copolymer of Preparation 1.

Fourth sample employed the fourth copolymer of Preparation 1.

Subsequently there was applied to the gelatin coating on the four subbed film base samples a layer of a conventional photographic gelatino silver halide emulsion.

It was found that in all four samples the layers were strongly adherent to one another and to the film support so that the final photographic film could be processed without danger of separation of the layers or frilling.

EXAMPLE 2

The following coating were applied sequentially to biaxially oriented film based on the synthetic linear polyester obtained from ethylene glycol and terephalic acid which is highly hydrophobic.

Sample 1 used copolymer 2
Sample 2 used copolymer 3
Sample 3 used copolymer 4
Sample 4 used copolymer 5
Sample 5 used copolymer 6
Sample 6 used copolymer 8 (comparative sample)
Sample 7 used copolymer (comparation sample)

First coating (all samples)

| | |
|---|---|
| solution of p - chloro - m - cresol | 2 g |
| methanol | 98 ml |

Second coating

| | |
|---|---|
| one of the copolymers listed above | 2 g |
| methyl ethyl ketone | 98 ml |

Third coating (all samples)

| | |
|---|---|
| deashed gelatin | 3.0 g |
| glacial acetic acid | 2 ml |
| water | 11 ml |
| methanol | 272 ml |
| ethyl lactate | 3 ml |

All samples then air dried for 5 minutes followed by 15 minutes at 105° C.

Subsequently there was applied to the gelatin coating on each of the samples 1–7 a conventional photographic gelatino silver halide emulsion. In the case of samples 1–5 it was found that all the layers adhered strongly one to another and to the film support so that the final photographic film would be processed without separation of the layers or frilling.

In the case of samples 6–7 which are outside the present invention some preparation and frilling of the layers during processing was observed.

This is shown more clearly in a wet alkaline solution test. In this test a hardened coloured gelatin layer was coated on to all the samples 1-7 instead of a gelatine silver halide emulsion layer, all the samples were placed in a 1% sodium hydroxide solution at room temperature and a surface scratch was made in each sample at five minute intervals. The length of time for an enlarged scratch area to be produced was noted. The results are shown in Table 1 below

TABLE 1

| Sample | Time for enlarged scratch area to appear |
|---|---|
| 1 | after 60 min. no enlarged area appears |
| 2 | after 60 min. no enlarged area appears |
| 3 | 30 minutes |
| 4 | after 60 min. no enlarged area appeared |
| 5 | 30 minutes |
| 6 | 15 minutes |
| 7 | 15 minutes |

This shows the superior adhesion exhibited by the film material of the present invention.

EXAMPLE 3

The following coatings were applied sequentially to biaxially oriented film vased on synthetic linear polyester obtained from ethylene glycol and terephthalic acid.
First coating

| | |
|---|---|
| solution of p - chloro - m - cresol | 2 g |
| methanol | 100 ml |

dried 2 minutes at 70° C.
second coating

| | |
|---|---|
| solution of<br>copolymer which comprises vinylidene chloride (40%)<br>methyl acrylate (42%)<br>monochloromethyl vinyl ketone (10%)<br>acrylic acid (6%)<br>itaconic acid (2%)<br>(as prepared in Preparation 7) | 2 g |
| in methyl ethyl ketone | 100 ml |

air dried for 5 minutes
Third coating

| | |
|---|---|
| deashed gelatin | 1.0 g |
| glacial acetic acid | 1.0 ml |
| water | 3.6 ml |
| methanol | 61 ml |
| acetone | 30 ml |

air dried for 5 minutes, followed by 15 minutes at 105° C.

Subsequently there was applied to the gelatin coating on the subbed film base a layer of a conventional photographic gelatino silver halide emulsion. It was found that the layers were strongly adherent one to another and to the film support so that the final photographic film could be processed without danger of separation of the layers or frilling in both cases.

EXAMPLE 4

The following coatings were applied sequentially to six sets of samples of biaxially oriented film based on the synethic linear polyester obtained from ethylene glycol and terephthalic acid.
First coating

| | |
|---|---|
| Applied to all sets of samples. | |
| solution of 4-chlororesorcinol | 2 g |
| in water | 100 ml |
| wetting agent | .075 g |

dried 5 minutes at 100° C.
Second coating

| | |
|---|---|
| Samples 1. | |
| Latex of preparation 10 | 10% solids in water |
| Samples 2. | |
| Latex 2 of preparation 11 | 10% solids in water |
| Samples 3. | |
| Latex 3 of preparation 12 | 10% solids in water |
| Samples 4. | |
| Latex 4 or preparation 13 | 10% solids in water |
| Samples 5. | |
| Latex 5 of preparation 14 | 10% solids in water |
| Samples 6. | |
| Latex 6 of preparation 15 | 10% solids in water |

All the samples were then dried for 5 minutes at 100° C.
Third coating
Applied to all six sets of samples

| | |
|---|---|
| deashed gelatin | 6.8 g |
| phenol | 0.38 g. |
| Wetting agents | 0.36 g. |
| Water to | 410 ml |

Air dried for 5 minutes followed by seasoning at 105° C for 15 minutes.

Two types of adhesion are important the first is dry adhesion. This adhesion relates to the copolymer on the base and to the hydropholic layer coated on the copolymer layer, the object of subbing being of course to enable the hydrophilic layer to remain firmly adherent on to the hydrophilic film base. The hydrophilic layer may be an antihalation backing layer or a photosensitive layer e.g. a silver halide emulsion layer. It is important that other layers remain firmly anchored to the base when the film material is finished, i.e. cut up into small strips and enclosed in cassettes or spooled up. Further it is important that the hydrophilic layers do not frill off when the film is placed in the camera or when removed from the camera.

There are no recognised standard dry adhesion tests. However the following two tests were carried out on strips of the six sets of Samples as prepared above each of which had been coated with a silver halide emulsion layer and then stored for 4 months after coating.

| | | | | | |
|---|---|---|---|---|---|
| Tear test: | (strip torn) | | | | |
| Effect Observed. | No fringe. | Small stripped fringe. | Large stripped fringe. | Large area peeled away | Whole coating peeled off. |
| Arbitrary Grade | 1 | 2 | 3 | 4 | 5 |
| Taps toast. | (razor cuts made on surface of strips, tape applied and torn away.) | | | | |
| Effect observed. | No coating | Small amount removed. | More removed. | Large areas removed. | Whole coating |

-continued

| | | | | | |
|---|---|---|---|---|---|
| | removed. | | | | removed. |
| Arbitrary Grade | 1 | 2 | 3 | 4 | 5 |

Strips of the six samples prepared above were subjected to these two dry tests, the results of which are shown in Table 2. The figure shown correspond to the Arbitrary Grade listed above.

TABLE 2.

| Samples | Test | Grade | Remarks. |
|---|---|---|---|
| 1 | Tear | 1 | Film base of invention |
| 2 | " | 1 | " |
| 3 | " | 1 | " |
| 4 | " | 1 | " |
| 5 | " | 2 | Film based not of invention |
| 6 | " | 3 | " |
| 1 | Tape | 1 | Film base of invention |
| 2 | " | 1 | " |
| 3 | " | 1 | " |
| 4 | " | 1 | " |
| 5 | " | 3 | Film base not of invention |
| 6 | " | 4 | " |

These results show that the film base according to the present invention exhibits very good dry adhesion but the film base according to the present invention that is to say when the subbing copolymer used did not comprise any units of formulae I or II, did not exhibit adequate dry adhesion.

Wet Adhesion

The film base of the present invention is of particular use as photographic film base in which case at least one photographic silver emulsion layer is coated on the subbed fim base, such subbed base usually having a gelatin subcoat present between the polymer layer and the emulsion layer.

Such photographic film material is usually processed in a sequence of aqueous processing baths and it is very important that all the final image layer is retained firmly on to the base.

A typical processing sequence comprises immersion in the listed aqueous baths in the period stated, alkaline developer bath 3 minutes, acid stop-bath 1 minute, acid fix bath 10 minutes, aqueous washing in circulating water 20 minutes, followed by hot air drying.

However some modern processes particularly when forced developement is required employ immersion in stronger alkaline solutions for longer periods. Thus a separate alkaline test was also included. This consisted on immersing the samples in 1% sodium hydroxide solution for 10 minutes followed by a normal washing. The samples were subjected to a scratch/rub test after wet processing this consisted of making a scratch mark in the coating on the film while still wet and then rubbing the film surface perpendicular to the scratch.

| | | Wet tests. | | |
|---|---|---|---|---|
| Effect observed. | No peeling of emulsion. | Some peeling. | Areas of emulsion lift | All emulsion lifts away |
| Arbitrary Grade. | 1 | 2 | 3 | 4 |

Strips of the six Samples prepared above were subjected to these two wet tests and the results are shown in Table 3. The figures shown correspond to the Arbitrary Grades listed above.

TABLE 3

| Sample | Test | Grade | Remarks |
|---|---|---|---|
| 1 | Normal Processing | 1 | Film base according to invention |
| 2 | " | 1 | " |
| 3 | " | 1 | " |
| 4 | " | 1 | " |
| 5 | " | 2 | Film base not according to invention |
| 6 | " | 2 | " |
| 1 | Alkaline test | 1 | Film base of invention |
| 2 | " | 1 | " |
| 3 | " | 1 | " |
| 4 | " | 1 | " |
| 5 | " | 4 | Film base not of invention. |
| 6 | " | 4 | " |

These wet tests show that the film base according to the present invention enables gelatin coatings to adhere very firmly to the film base during wet processing test even when the wet processing solution is strongly alkaline.

What we claim is:

1. Film material comprising a film of biaxially oriented synthetic linear polyester of highly hydrophobic character having superimposed thereon adherent to said film a layer which comprises a copolymer consisting of (a) 20 to 90 mole % of vinylidene chloride, (b) 5 to 50 mole % of a copolymerisable ethylenically unsaturated monomer selected from the group consisting of alkyl acrylate, alkyl methacrylate, vinyl acetate and acrylonitrile, (c) 1 to 20 mole % of at least one copolymerisable acid selected from the group consisting of acrylic acid, methacrylic acid, itaconic acid, maleic acid, fumaric acid, crotonic acid, mesaconic acid and citraconic acid and (d) 1 to 30 mole % of ($d_1$) an allyl component of the formula

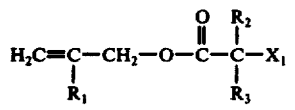

$R_1$ is hydrogen or methyl $X_1$ is a bromine or chlorine atom and $R_2$ and $R_3$ are each hydrogen or methyl or are the same halogen atom as $X_1$, or ($d_2$) a vinyl component of the formula

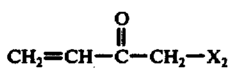

wherein $X_2$ is a chlorine or bromine atom.

2. Film material according to claim 1 wherein the copolymerisable ethylenically unsaturated monomer (b) is methyl acrylate.

3. Film material according to claim 1 wherein the component (d) is derived from allyl monomers of formula

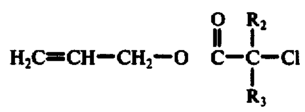

whrein $R_2$ and $R_3$ have the meaning given in claim 1.

4. Film material according to claim 1 wherein the component (d) is derived from allyl monochloroacetate.

* * * * *